(12) United States Patent
Ren et al.

(10) Patent No.: US 11,192,169 B2
(45) Date of Patent: Dec. 7, 2021

(54) METAL MIDDLE FRAME MACHINING PROCESS

(71) Applicant: GUANGDONG EVERWIN PRECISION TECHNOLOGY CO., LTD., Dongguan (CN)

(72) Inventors: Xiangsheng Ren, Dongguan (CN); Lidong Wang, Dongguan (CN)

(73) Assignee: GUANGDONG EVERWIN PRECISION TECHNOLOGY CO., LTD., Dongguan (CN)

(*) Notice: Subject to any disclaimer, the term of this patent is extended or adjusted under 35 U.S.C. 154(b) by 0 days.

(21) Appl. No.: 16/088,825

(22) PCT Filed: Mar. 9, 2018

(86) PCT No.: PCT/CN2018/078543
§ 371 (c)(1),
(2) Date: Sep. 27, 2018

(87) PCT Pub. No.: WO2019/140764
PCT Pub. Date: Jul. 25, 2019

(65) Prior Publication Data
US 2020/0338623 A1 Oct. 29, 2020

(30) Foreign Application Priority Data

Jan. 17, 2018 (CN) .......................... 201810043851.2
Jan. 17, 2018 (CN) .......................... 201820080858.7
Jan. 17, 2018 (CN) .......................... 201820081176.8

(51) Int. Cl.
*B21D 39/03* (2006.01)
*B21D 51/16* (2006.01)
*H04M 1/02* (2006.01)

(52) U.S. Cl.
CPC ............ *B21D 51/16* (2013.01); *H04M 1/026* (2013.01)

(58) Field of Classification Search
CPC ...................................................... B21D 39/03
See application file for complete search history.

(56) References Cited

U.S. PATENT DOCUMENTS

| 2014/0106085 A1* | 4/2014 | Cho ........................ H01Q 1/243 |
| | | 427/555 |
| 2015/0098247 A1* | 4/2015 | Shin ........................ G02B 6/009 |
| | | 362/611 |

(Continued)

FOREIGN PATENT DOCUMENTS

| CN | 104551526 A | 4/2015 |
| CN | 105162910 A | 12/2015 |

(Continued)

OTHER PUBLICATIONS

International Search Report dated Oct. 18, 2018 in the corresponding International application (application No. PCT/CN2018/078543).

*Primary Examiner* — Olisa Anwah
(74) *Attorney, Agent, or Firm* — W&G Law Group (57) ABSTRACT

The present disclosure relates to a process of machining a metal middle frame, which includes the following steps of: obtaining a sheet material and cutting the sheet material into a linear profile; performing a finish machining to the linear profile; bending the linear profile after the finish machining, obtaining a metal border frame with an R angle; welding the metal border frame; and placing the metal border frame after the welding in a die-casting mold, providing a die-casting metal liquid, thereby obtaining a die-cast middle plate connected to the metal border frame, so as to form the metal middle frame.

16 Claims, 6 Drawing Sheets

(56) References Cited

U.S. PATENT DOCUMENTS

| | | | |
|---|---|---|---|
| 2017/0118867 A1* | 4/2017 | Chang | G06F 1/1656 |
| 2018/0109657 A1* | 4/2018 | Tang | H04M 1/0202 |
| 2018/0255664 A1* | 9/2018 | Cai | H05K 7/20 |
| 2019/0006739 A1* | 1/2019 | Yu | H01Q 15/14 |
| 2019/0070760 A1* | 3/2019 | Huang | H04M 1/0202 |
| 2019/0143388 A1* | 5/2019 | Zeng | B21D 13/02 |
| | | | 29/527.4 |
| 2019/0260861 A1* | 8/2019 | Wang | H04M 1/0202 |
| 2019/0264318 A1* | 8/2019 | Ke | C23C 28/023 |
| 2020/0304162 A1* | 9/2020 | Ren | B29C 45/14311 |

FOREIGN PATENT DOCUMENTS

| | | |
|---|---|---|
| CN | 106563919 A | 4/2017 |
| CN | 107087366 A | 8/2017 |
| CN | 107322245 A | 11/2017 |
| CN | 107398687 A | 11/2017 |
| WO | 2012162909 A1 | 12/2012 |

* cited by examiner

METAL MIDDLE FRAME MACHINING PROCESS

CROSS-REFERENCE TO RELATED APPLICATIONS

This application is the national phase of International Application No. PCT/CN2018/078543, filed on Mar. 9, 2018, which claims the benefit of Chinese Patent Application No. 201820080858.7, 201820081176.8, and 201810043851.2, filed on Jan. 17, 2018, the entire content of which are incorporated herein in its entirety.

TECHNICAL FIELD

The present disclosure relates to the technical field of smart devices, and particularly relates to a process of machining a metal middle frame.

BACKGROUND

With the continuous development of mobile terminal technology, the application of electronic devices such as smart phones, personal digital assistants (PDAs), smart watches, and the like has become extremely popular, and has become an important part of people's work and life. The housing of the electronic device usually adopts a metal middle frame structure. The metal middle frame structure has the advantages of wear resistance and easy heat dissipation, and at the same time enables the product to leave a high-end impression to the users. The metal middle frame structure includes a metal border frame and a middle plate. Generally, the conventional metal middle frame adopts a method of integrally forming a rough blank, and then a CNC machining is performed to the rough blank. The CNC machining is relatively complicated, wastes more materials, and has a low production efficiency, which is not conducive to the reduction of manufacturing costs. The improved process adopts a method of separately forming. In other words, the metal border frame is formed by forging and CNC machining, and then the metal border frame and the middle plate are combined into a metal middle frame structure. However, there are also defects of low efficiency and high cost.

SUMMARY

Accordingly, in view of the problems in the metal middle frame machining, it is necessary to provide a process of machining a metal middle frame with a high material utilization, a simple process, and a high production efficiency.

A process of machining a metal middle frame includes the following steps of:

obtaining a sheet material, and cutting the sheet material into a linear profile;

performing a finish machining to the linear profile;

bending the linear profile after finish machining, obtaining a metal border frame with an R angle;

welding the metal border frame; and placing the metal border frame after the welding in a die-casting mold, providing a die-casting metal liquid, thereby obtaining a die-cast middle plate connected to the metal border frame, so as to form the metal middle frame.

In the aforementioned process of machining the metal middle frame, since the metal middle frame adopts the bending, welding, and die-casting molding process, material waste due to the machining allowance of the metal border frame is reduced and the proportion of raw material cost in the total manufacturing cost is lowered. Meanwhile, an intermediate stamping, CNC machining, and heat treatment process are reduced, and the machining time of the metal middle frame is reduced, thereby improving the production efficiency of the entire metal middle frame.

In one embodiment, the process further includes the steps of:

performing an auxiliary machining to the metal middle plate to obtain an antenna groove; and surface treating the metal middle plate.

In one embodiment, the finish machining includes: machining a dovetail groove on the linear profile, and performing a polishing treatment to an end surface of the linear profile.

In one embodiment, the dovetail groove has a depth of 0.08 nm, and an opening of the dovetail groove has a minimum width of 2 mm and a maximum width of 2.3 mm.

In one embodiment, the welding is to weld end seams of the metal border frames.

In one embodiment, a seam width at the end seam of the metal border frame is 0.05 mm to 0.15 mm.

In one embodiment, the finish machining includes: machining a patch groove on the linear profile, and performing a polishing treatment to an end surface of the linear profile.

In one embodiment, the patch groove has a depth of 0.02 mm.

In one embodiment, the welding includes: providing an L-shaped metal patch and performing the finish machining; attaching the required metal patches in the patch groove in sequence and performing welding; and welding end seams of the metal border frames.

In one embodiment, the metal patch is finish machined to obtain a plurality of irregular-shaped bayonet, a fully enclosed welding is performed to a periphery of an attaching surface of the metal patch and the metal border frame.

In one embodiment, the irregular-shaped bayonet is a C-shaped bayonet or a trapezoidal bayonet.

In one embodiment, a length ratio between the metal patch welded on a long side surface of the metal border frame and the metal patch welded on a short side surface of the metal border frame is equal to a length ratio between the long side surface and the short side surface.

In one embodiment, after the bending, the process further includes performing standard detections to the R angle, crack, and flatness of the metal border frame, such that each of the R angles is consistent, a surface of the metal border frame has no crack, and a flatness of the metal border frame is less than 0.12.

In one embodiment, the die-casting metal liquid has a temperature of 610° C. to 630° C.

In one embodiment, a filling rate of the metal liquid is 28 m/s to 32 m/s, and a filling time is 0.013 s to 0.015 s.

DETAILED DESCRIPTION OF THE EMBODIMENTS

Embodiments of the present disclosure are described more fully hereinafter with reference to the accompanying drawings. An embodiment is described in the accompanying drawings. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

It will be understood that when an element is referred to as being "fixed" to another element, it can be directly fixed to the other element or intervening elements may be presented. Also, when an element is referred to as being "connected" or "coupled" to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. The terms used herein is for the purpose of describing particular embodiments only and is not intended to limit the present disclosure.

Figure 1:
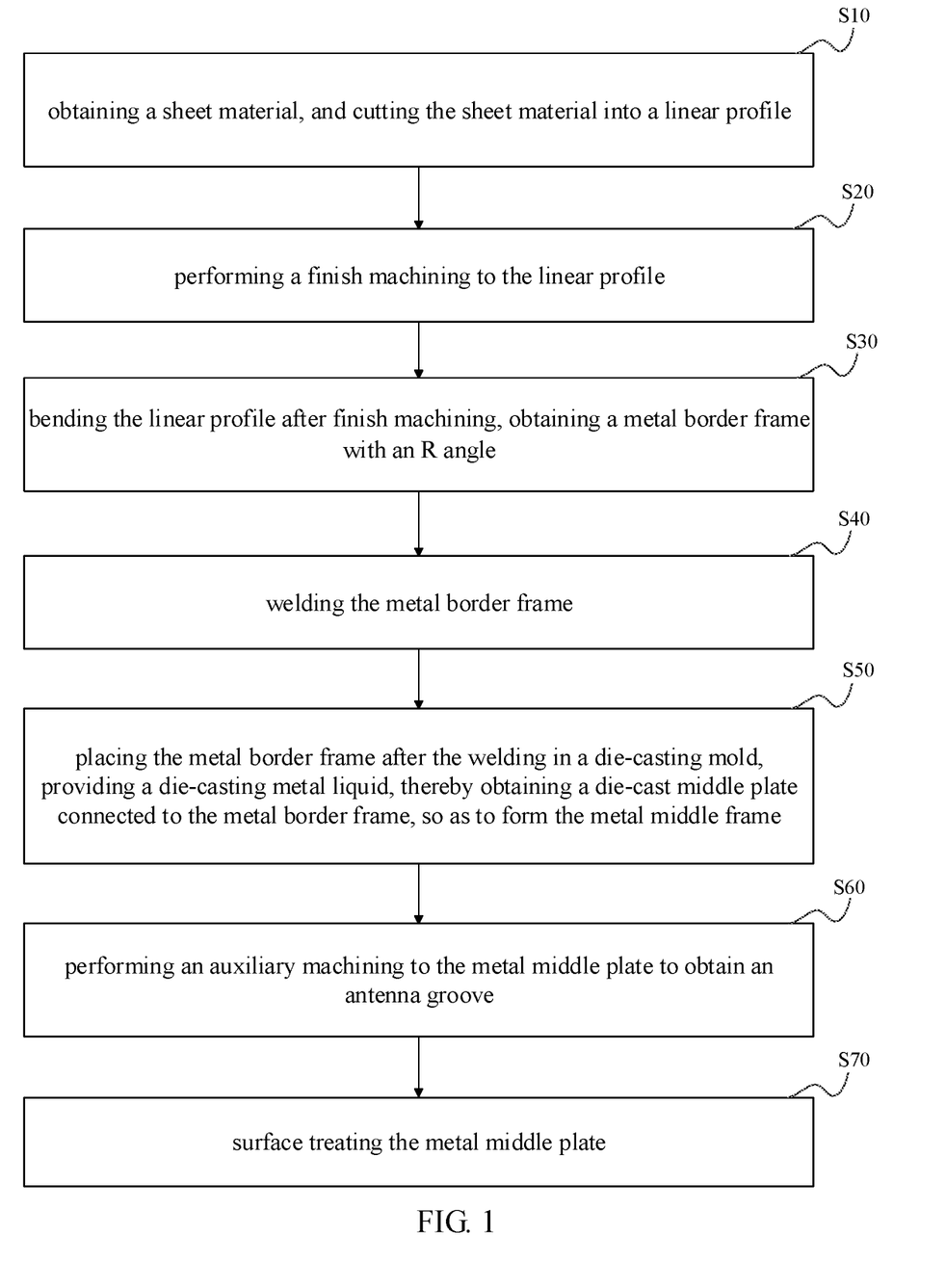
FIG. 1 is a flowchart of a process of machining a metal middle frame according to the present disclosure.

Referring to FIG. 1, a process of machining a metal middle frame according to an embodiment of the present disclosure includes the following steps of:

In step S10, a sheet material is obtained, and the sheet material is cut into a linear profile.

In step S20, a finish machining is performed to the linear profile.

In step S30, the linear profile after finish machining is bent to obtain a metal border frame with an R angle.

In step S40, the metal border frame is welded.

In step S50, the metal border frame after the welding is placed in a die-casting mold and a die-casting metal liquid is provided, thereby obtaining a die-cast middle plate connected to the metal border frame, so as to form the metal middle frame.

In step S60, an auxiliary machining is performed to the metal middle plate to obtain an antenna groove.

In step S70, the metal middle plate is surface treated.

Figure 2:
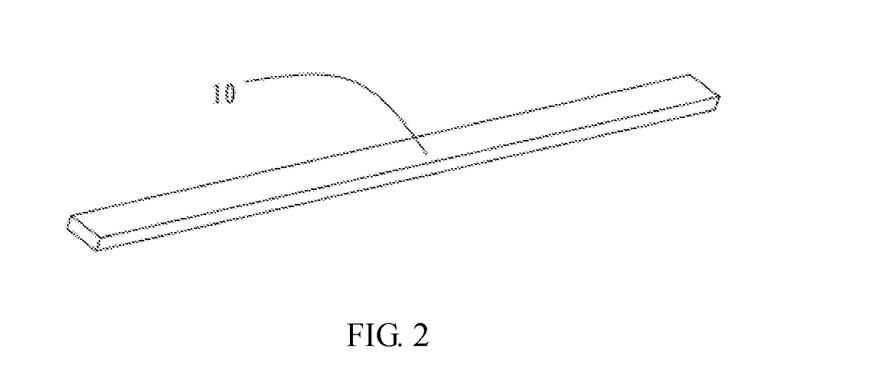
FIG. 2 is a schematic view of a linear profile cut from a sheet material.

Referring to FIG. 2 to FIG. 6, a process of machining a metal middle frame according to an embodiment of the present disclosure is described. The process mainly includes the following steps of:

In step S10, a sheet material is obtained, and the sheet material is cut into a linear profile 10. Referring to FIG. 2, the sheet material can be cut according to the actual specification required by workers. In the illustrated embodiment, the sheet material is made of stainless steel having a hardness of 180 HV to 220 HV. A plurality of cutting guide lines are preset on the sheet material, and the sheet material is finally cut into one or more linear profiles 10. The linear profiles 10 have the same length, which can ensure that bending does not occur. In the illustrated embodiment, the sheet material is cut along its grain direction by using laser. In alternative embodiments, the linear profile can be obtained by blanking, thermal cutting, or cold cutting. The thermal cutting includes laser cutting, arc cutting, plasma arc cutting, and flame cutting. The cold cutting is jet cutting.

Figure 3:
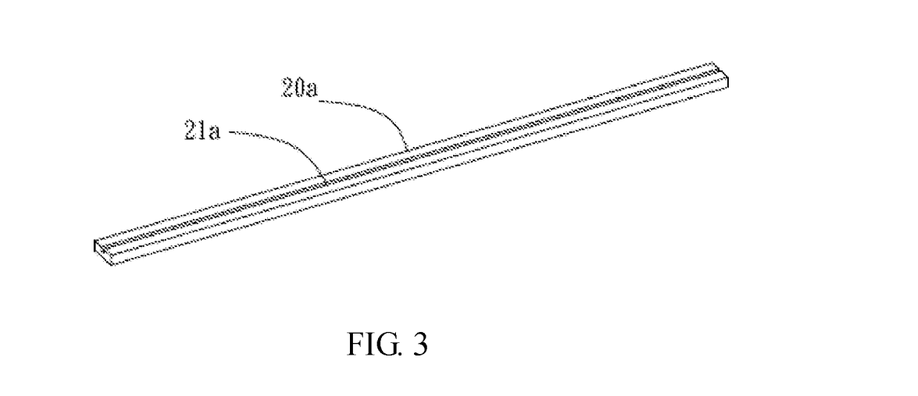
FIG. 3 is a schematic view a linear profile after finish machining according to an embodiment.

In step S20, a finish machining is performed to the linear profile. The finish machining includes machining a dovetail groove 21*a* on the linear profile 10, and performing a polishing treatment to an end surface of the linear profile 10 to obtain a linear profile 20*a* with the dovetail groove. The dovetail groove 21*a* is machined using a three-axis CNC controlling milling cutter, which performs a cutting machining on the linear profile 10 for about 100 s to 130 s at a rotation speed of 8000 r/min, a feeding speed of 1200 mm/min, and a cutting depth of 0.8 mm, until a longitudinally extending dovetail groove 21*a* is formed on the linear profile 10. The dovetail groove has a depth of 0.08 nm, and an opening of the dovetail groove has a minimum width of 2 mm and a maximum width of 2.3 mm. The polishing treatment is performed by grinding or milling, such that an end of the linear profile 10 meets the relevant requirements of flatness and roughness. There is no burr at the end, which makes the butting between the ends accurate, thereby facilitating the quality of the weld and the precision of the metal border frame 30*a*.

Figure 4:
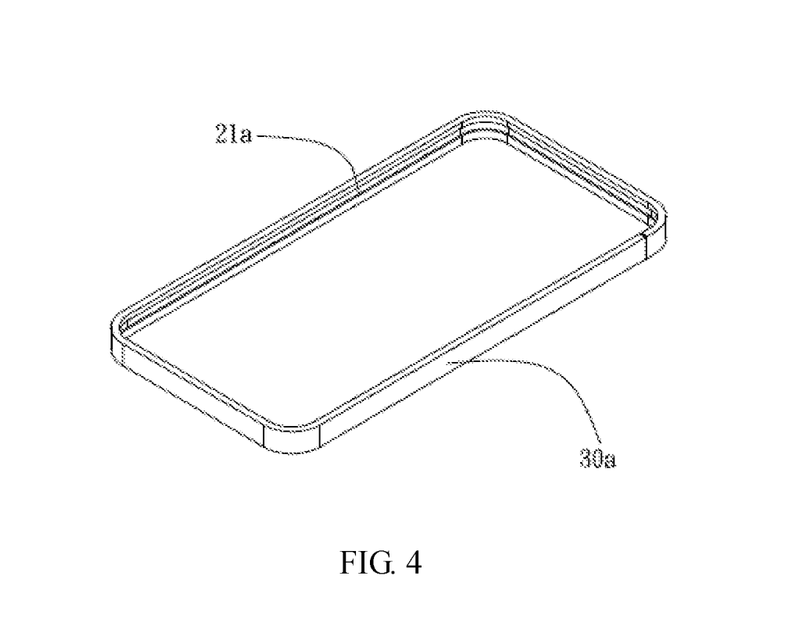
FIG. 4 is a schematic view showing a metal border frame obtained after bending the linear profile of FIG. 3.

In step S30, after the finish machining, the linear profile 20*a* is bent to obtain a metal border frame 30*a* having an R angle. The bending includes placing the linear profile 20*a* on a bending fixture for clamping and positioning, and then two touching arms of the bending fixture simultaneously abutting and pushing the linear profile 20*a* to bend to form an U-shaped member having two R angles, one long side, and one short side. When a supporting block is mounted by clamping and positioning, and the U-shaped member is latched and sleeved on the supporting block, the long side is aligned with the touching arm, the long side is bent under the abutment and pushing of the touching arm to form a third R angle to form a middle member, and then the middle member is repositioned to be placed on the supporting block, such that the short side is aligned with the touching arm. The short side is bent under the abutment and touching of the touching arm to form a fourth R angle. At this time, an end of the long side is opposed to an end of the short side, and a seam of 0.05 mm to 0.15 mm is formed, thereby forming the metal border frame 30*a*. After the bending, standard detections are performed to the R angle, crack, and flatness of the metal border frame, such that each of the R angles is consistent (the R angle is 9.2° in the illustrated embodiment), a surface of the metal border frame 30*a* has no crack, and a flatness of the metal border frame 30*a* is less than 0.12. If the aforementioned R angle, crack and flatness are not qualified in the standard detections, the unqualified items are screened and removed to avoid entering the next process, thereby reducing the occurrence of unnecessary processes.

In step S40, the metal border frame 30*a* is welded. An end seam of the metal border frame 30*a* is welded by the welding, which may be performed by robot welding or manual welding. After the welding, the seam is filled with a welding material 40*a* to connect ends of the metal border frame 30*a*, such that a welding junction can withstand a drawing force of 100 kg to 120 kg, a shearing force of 240 kg to 260 kg, and a flatness of less than 0.12.

Figure 5:
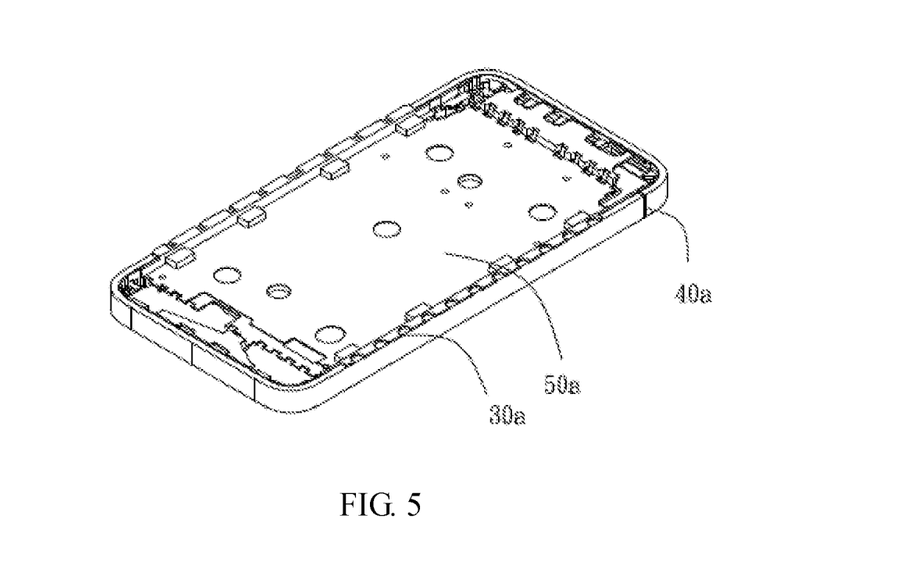
FIG. 5 is a schematic view showing a metal middle frame obtained after die-casting the metal border frame of FIG. 4.

In step S50, the metal border frame 30a after the welding is placed in a die-casting mold and a die-casting metal liquid (liquid aluminum alloy) is provided, thereby obtaining a die-cast middle plate 50a connected to the metal border frame 30a, so as to form the metal middle frame. During the die-casting process, a die-casting machine fills the metal liquid having a temperature of 610° C. to 630° C. into an interior of the die-casting mold at a rate of 28 m/s to 32 m/s for 0.013 s to 0.015 s. Then, a shaping process is performed for 7 s to 9 s, and finally the die-casting mold is opened to obtain the metal middle frame.

In step S60, an auxiliary machining is performed to the metal middle plate to obtain an antenna groove. After performing a cooling process to the metal middle plate, the metal middle plate is placed on a CNC worktable for positioning. Then, a CNC milling cutter mills the metal middle frame inwardly from an inner side surface thereof to form the antenna groove, and plastic is filled in the antenna groove by injection molding.

In step S70, the metal middle plate is surface treated, such that the welding material at the seam is grinded. When the metal middle frame is made of stainless steel, the surface treatment is performed by sand blasting or mirror polishing process, and then physical vapor deposition (PVD) treatment is applied. For example, a PVD coating is deposited by a magnetron sputtering method. Finally, an anti-fingerprint (AF) film is deposited on the PVD coating by an AF coating machine, thereby improving the wear resistance, waterproofness, and oil-proofing of the surface of the metal middle frame structure. Of course, the AF film deposition process can also be performed directly on the sand blasted surface without obtaining the PVD coating.

Figure 6:
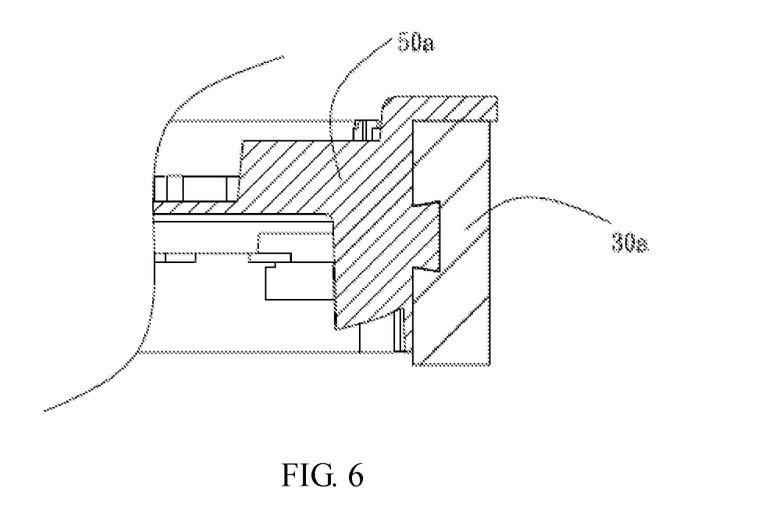
FIG. 6 is a partial cross-sectional view of the metal middle frame of FIG. 5.

In the aforementioned process of machining the metal middle frame, since the metal middle frame adopts the bending, welding, and die-casting molding process, material waste due to the machining allowance of the metal border frame is reduced and the proportion of raw material cost in the total manufacturing cost is lowered. Meanwhile, an intermediate stamping, CNC machining, and heat treatment process are reduced, and the machining time of the metal middle frame is reduced, thereby improving the production efficiency of the entire metal middle frame. Since the structure of the dovetail groove 21a is filled, the middle plate 50a and the metal border frame 30a in the obtained metal middle frame form an inverted physical structure, which has a stable connection and a good waterproof property, such that the product quality is high.

Referring to FIG. 2, and FIG. 7 to FIG. 11, a process of machining a metal middle frame according to another embodiment of the present disclosure is described. The process mainly includes the following steps of:

In step S10, a sheet material is obtained, and the sheet material is cut into a linear profile 10. Referring to FIG. 2, the sheet material can be cut according to the actual specification required by workers. In the illustrated embodiment, the sheet material is made of stainless steel having a hardness of 180 HV to 220 HV. A plurality of cutting guide lines are preset on the sheet material, and the sheet material is finally cut into one or more linear profiles 10. The linear profiles 10 have the same length, which can ensure that bending does not occur. In the illustrated embodiment, the sheet material is cut along its grain direction by using laser. In alternative embodiments, the linear profile can be obtained by blanking, thermal cutting, or cold cutting. The thermal cutting includes laser cutting, arc cutting, plasma arc cutting, and flame cutting. The cold cutting is jet cutting.

Figure 7:
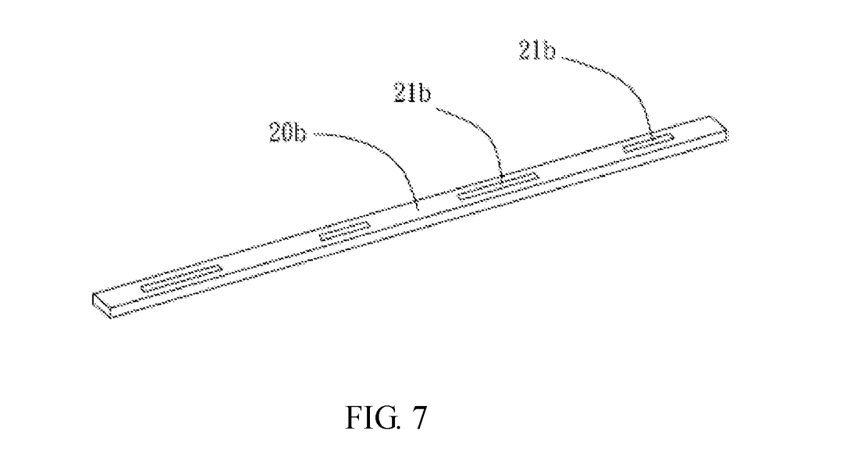
FIG. 7 is a schematic view a linear profile after finish machining according to another embodiment.

In step S20, a finish machining is performed to the linear profile. The finish machining includes machining a patch groove 21b on the linear profile 10, and performing a polishing treatment to an end surface of the linear profile 10 to obtain a linear profile 20b with the patch groove 21b. The patch groove 21b is machined using a three-axis CNC controlling milling cutter, which performs a cutting machining on the linear profile 10 for about 3 s to 5 s at a rotation speed of 8000 r/min, a feeding speed of 800 mm/min, and a cutting depth of 0.02 mm, until four longitudinally arranged patch grooves 21b are formed on the linear profile 10. The polishing treatment is performed by grinding or milling, such that an end of the linear profile 10 meets the relevant requirements of flatness and roughness. There is no burr at the end, which makes the butting between the ends accurate, thereby facilitating the quality of the weld and the precision of the metal border frame 30b.

Figure 8:
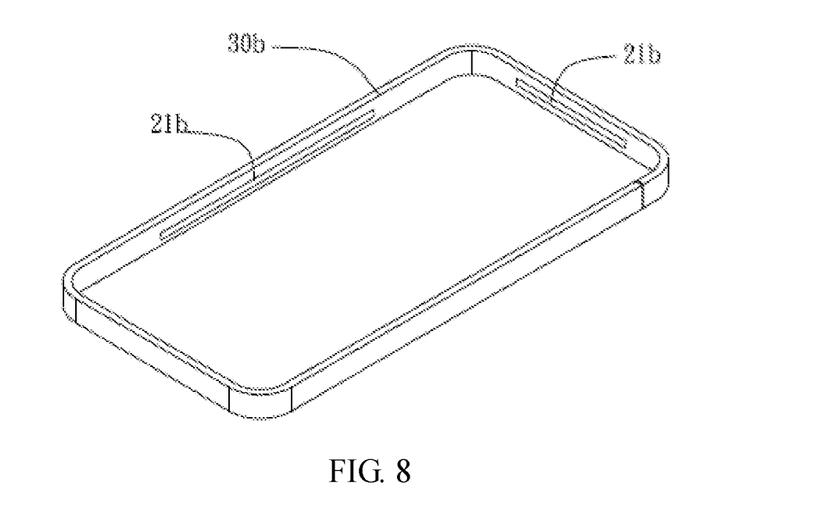
FIG. 8 is a schematic view showing a metal border frame obtained after bending the linear profile of FIG. 7.

In step S30, after the finish machining, the linear profile 20b is bent to obtain a metal border frame 30b with an R angle. The bending includes placing the linear profile 20b on a bending fixture for clamping and positioning, and then two touching arms of the bending fixture simultaneously abutting and pushing the linear profile 20b to bend to form an U-shaped member having two R angles, one long side, and one short side. When a supporting block is mounted by clamping and positioning and the U-shaped member is latched and sleeved on the supporting block, the long side is aligned with the touching arm, the long side is bent under the abutment and pushing of the touching arm to form a third R angle to form a middle member, and then the middle member is repositioned to be placed on the supporting block, such that the short side is aligned with the touching arm. The short side is bent under the abutment and touching of the touching arm to form a fourth R angle. At this time, an end of the long side is opposed to an end of the short side, and a seam of 0.05 mm to 0.15 mm is formed, thereby forming the metal border frame 30b. After the bending, standard detections are performed to the R angle, crack, and flatness of the metal border frame, such that each of the R angles is consistent (the R angle is 9.2° in the illustrated embodiment), a surface of the metal border frame 30b has no crack, and a flatness of the metal border frame 30b is less than 0.12. If the aforementioned R angle, crack and flatness are not qualified in the standard detections, the unqualified items are screened and removed to avoid entering the next process, thereby reducing the occurrence of unnecessary processes.

Figure 9:
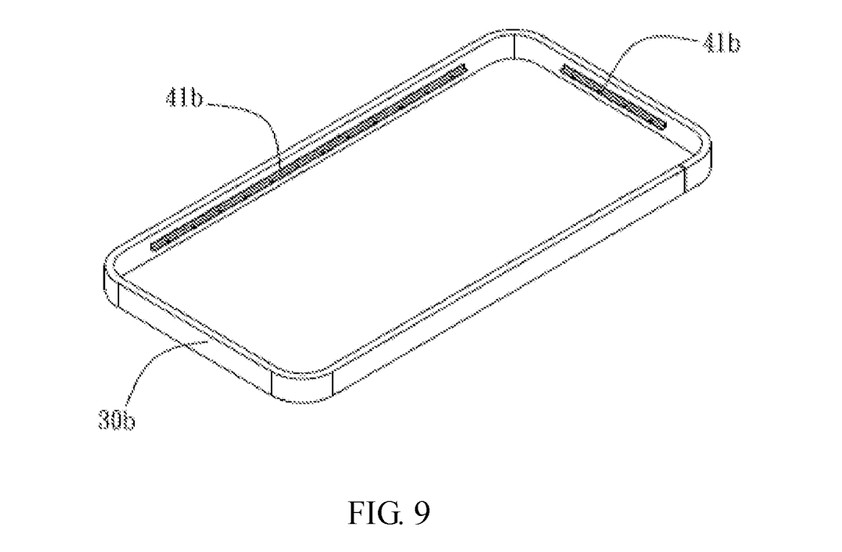
FIG. 9 is a schematic view of the metal border frame of FIG. 8 after attaching metal patches.

In step S40, the metal border frame 30b is welded. The welding includes providing an L-shaped metal patch 41b to perform the finish machining; attaching the required metal patches 41b in the patch groove 21b in sequence to perform welding; welding end seams of the metal border frames 30b. The metal patch 41b is finish machined to obtain a plurality of irregular-shaped bayonet, and a fully enclosed welding is performed to a periphery of an attaching surface of the metal patch 41b and the metal border frame 30b, such that the middle plate material in the subsequent die-casting process is prevented from entering the gap and affecting the welding stability. The metal patch has a tensile strength greater than or equal to 600 N. The irregular-shaped bayonet is a C-shaped bayonet or a trapezoidal bayonet. A length ratio between the metal patch 41b welded on a long side surface of the metal border frame 30b and the metal patch 41b welded on a short side surface of the metal border frame 30b is equal to a length ratio between the long side surface and the short side surface. This ensures that the supporting force distribution on the metal border frame 30b in the subsequent die-casting is balanced. The end seams are welded, which may be performed by robot welding or manual welding. After the welding, the seam is filled with a welding material 40b to connect ends of the metal border frame 30b, such that a welding junction can withstand a drawing force of 100 kg to 120 kg, a shearing force of 240 kg to 260 kg, and a flatness of less than 0.12.

Figure 10:
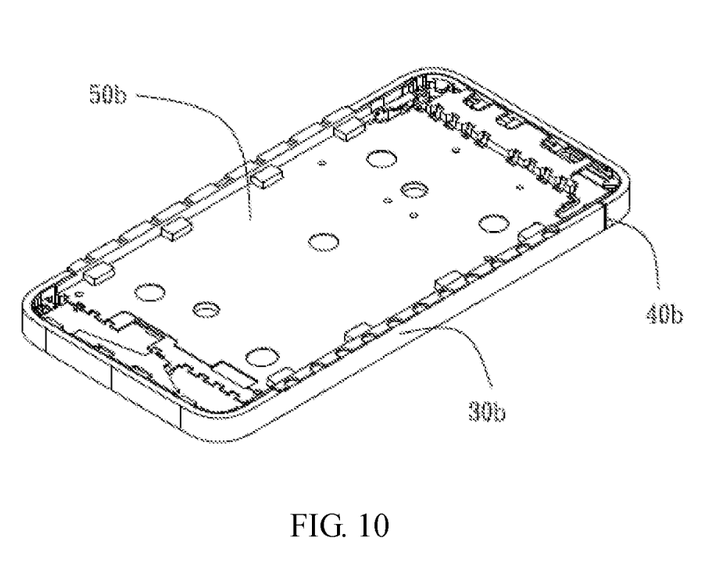
FIG. 10 is a schematic view showing a metal middle frame obtained after die-casting the metal border frame of FIG. 8.

In step S50, the metal border frame 30b after the welding is placed in a die-casting mold and a die-casting metal liquid (liquid aluminum alloy) is provided, thereby obtaining a die-cast middle plate 50b connected to the metal border frame 30b, so as to form the metal middle frame. During the die-casting process, a die-casting machine fills the metal liquid having a temperature of 610° C. to 630° C. into an interior of the die-casting mold at a rate of 28 m/s to 32 m/s for 0.013 s to 0.015 s. Then, a shaping process is performed for 7 s to 9 s, and finally the die-casting mold is opened to obtain the metal middle frame.

In step S60, an auxiliary machining is performed to the metal middle plate to obtain an antenna groove. After performing a cooling process to the metal middle plate, the metal middle plate is placed on a CNC worktable for positioning. Then, a CNC milling cutter mills the metal middle frame inwardly from an inner side surface thereof to form the antenna groove, and plastic is filled in the antenna groove by injection molding.

In step S70, the metal middle plate is surface treated, such that the welding material at the seam is grinded. When the metal middle frame is made of stainless steel, the surface treatment is performed by sand blasting or mirror polishing process, and then physical vapor deposition (PVD) treatment is applied. For example, a PVD coating is deposited by a magnetron sputtering method. Finally, an anti-fingerprint (AF) film is deposited on the PVD coating by an AF coating machine, thereby improving the wear resistance, waterproofness, and oil-proofing of the surface of the metal middle frame structure. Of course, the AF film deposition process can also be performed directly on the sand blasted surface without obtaining the PVD coating.

Figure 11:
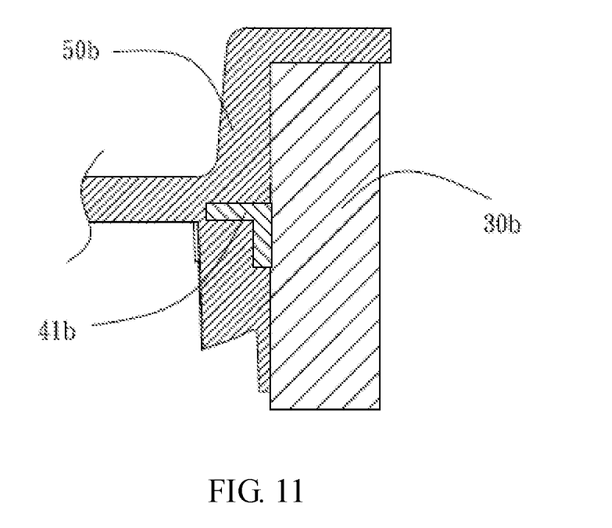
FIG. 11 is a partial cross-sectional view of the metal middle frame of FIG. 10.

In the aforementioned process of machining the metal middle frame, since the metal middle frame adopts the bending, welding, and die-casting molding process, material waste due to the machining allowance of the metal border frame is reduced and the proportion of raw material cost in the total manufacturing cost is lowered. Meanwhile, an intermediate stamping, CNC machining, and heat treatment process are reduced, and the machining time of the metal middle frame is reduced, thereby improving the production efficiency of the entire metal middle frame. Since the metal middle frame is die-cast by the metal border frame 30b welded with the metal patches 41b, the middle plate 50b, the metal border frame 30b, and the metal patch 41b in the obtained metal middle frame have an inverted physical structure, which has a large connection area, a stable connection, and a good waterproof property, thereby improving the product quality.

The technical features of the embodiments described above can be arbitrarily combined. In order to make the description succinct, there is no describing of all possible combinations of the various technical features in the foregoing embodiments. It should be noted that there is no contradiction in the combination of these technical features which should be considered as the scope of the description.

Although the present disclosure is illustrated and described herein with reference to specific embodiments, the present disclosure is not intended to be limited to the details shown. It is to be noted that, various modifications may be made in the details within the scope and range of equivalents of the claims and without departing from the present disclosure. Therefore, the protection scope of the present disclosure shall be subject to the protection scope of the claims.

What is claimed is:

1. A method of machining a metal middle frame, the method comprising:
    obtaining a sheet material, and cutting the sheet material into a linear profile;
    performing a finish machining to the linear profile;
    bending the linear profile after finish machining, obtaining a metal border frame with an R angle;
    performing standard detections to the R angle, crack, and flatness of the metal border frame in such a manner that the R angle is consistent to the standard, a surface of the metal border frame has no crack, and a flatness of the metal border frame is less than 0.12;
    welding the metal border frame; and
    placing the metal border frame after the welding in a die-casting mold, providing a die-casting metal liquid, thereby obtaining a die-cast middle plate connected to the metal border frame, so as to form the metal middle frame.

2. The method of machining the metal middle frame according to claim 1, further comprising:
    performing an auxiliary machining to the metal middle plate to obtain an antenna groove; and
    surface treating the metal middle plate.

3. The method of machining the metal middle frame according to claim 1, wherein the finish machining comprises: machining a dovetail groove on the linear profile.

4. The method of machining the metal middle frame according to claim 3, wherein the dovetail groove has a depth of 0.08 nm, and an opening of the dovetail groove has a minimum width of 2 mm and a maximum width of 2.3 mm.

5. The method of machining the metal middle frame according to claim 3, wherein the welding is to joint at least two metal border frames together by welding end seams of the metal border frames.

6. The method of machining the metal middle frame according to claim 5, wherein a seam width at the end seam of the metal border frame is 0.05 mm to 0.15 mm.

7. The method of machining the metal middle frame according to claim 1, wherein the finish machining comprises: machining a patch groove on the linear profile.

8. The method of machining the metal middle frame according to claim 7, wherein the patch groove has a depth of 0.02 mm.

9. The method of machining the metal middle frame according to claim 7, wherein the welding comprises:
    providing an L-shaped metal patch and performing the finish machining;
    attaching the required metal patches in the patch groove in sequence and performing welding; and
    joint at least two metal border frames together by welding end seams of the metal border frames.

10. The method of machining the metal middle frame according to claim 9, wherein the metal patch is finish machined to obtain a plurality of irregular-shaped bayonet, a fully enclosed welding is performed to a periphery of an attaching surface of the metal patch and the metal border frame.

11. The method of machining the metal middle frame according to claim 10, wherein the irregular-shaped bayonet is a C-shaped bayonet or a trapezoidal bayonet.

12. The method of machining the metal middle frame according to claim 10, wherein a length ratio between the metal patch welded on a long side surface of the metal border frame and the metal patch welded on a short side surface of the metal border frame is equal to a length ratio between the long side surface and the short side surface.

13. The method of machining the metal middle frame according to claim 1, wherein the die-casting metal liquid has a temperature of 610° C. to 630° C.

14. The method of machining the metal middle frame according to claim 13, wherein a filling rate of the metal liquid is 28 m/s to 32 m/s, and a filling time is 0.013 s to 0.015 s.

15. A method of machining a metal middle frame, the method comprising:
- obtaining a sheet material, and cutting the sheet material into a linear profile;
- machining a dovetail groove on the linear profile;
- bending the linear profile to obtain a metal border frame with an R angle;
- jointing at least two metal border frames together by welding the metal border frames; and
- placing the metal border frame after the welding in a die-casting mold, providing a die-casting metal liquid to fill the dovetail groove, thereby obtaining a die-cast middle plate connected to the metal border frame, so as to form the metal middle frame.

16. A method of machining a metal middle frame, the method comprising:
- obtaining a sheet material, and cutting the sheet material into a linear profile;
- machining a patch groove on the linear profile;
- bending the linear profile to obtain a metal border frame with an R angle;
- providing an L-shaped metal patch and performing a finish machining to obtain a matched L-shaped metal patch;
- attaching the matched L-shaped metal patch in the patch groove in sequence and performing welding;
- jointing at least two metal border frames together by welding the metal border frames; and
- placing the metal border frame after the welding in a die-casting mold, providing a die-casting metal liquid to combine the metal patches, thereby obtaining a die-cast middle plate connected to the metal border frame, so as to form the metal middle frame.

* * * * *